United States Patent

[11] 3,565,250

[72] Inventors Ross Borba;
Peter C. Kercher, Riverdale; Carl W. Ruegg; Ralph W. Starr, Selma, Calif.
[21] Appl. No. 750,731
[22] Filed Aug. 6, 1968
[45] Patented Feb. 23, 1971
[73] Assignees Ross Borba;
Peter C. Kercher
Riverdale, Calif., fractional part interest to each

[54] PORTABLE SORTING MACHINE AND SORTING METHOD
13 Claims, 11 Drawing Figs.
[52] U.S. Cl. .................................................. 209/125, 53/248
[51] Int. Cl. ............................................... B07c 7/04
[50] Field of Search ........................................ 209/123, 125; 302/14, 16; 56/1; 53/248

[56] References Cited
UNITED STATES PATENTS
| | | | |
|---|---|---|---|
| 1,557,505 | 10/1925 | Wadsworth | 209/125 |
| 3,269,099 | 8/1966 | Fricks | 56/1 |
| 3,470,670 | 10/1969 | Gorin | 53/248X |

*Primary Examiner*—Richard A. Schacher
*Attorney*—Huebner and Worrel

ABSTRACT: A portable sorting and loading method and machine for use in sorting or culling useable from unuseable discrete articles of fragile agricultural produce and loading the useable produce in containers, characterized by a plurality of driven produce sorting tables for conveying articles of produce past sorting stations, and a water-bath receiver, conveying and container loading apparatus, whereby discrete articles of agricultural produce may be conveyed past a sorting station and subsequently loaded into containers in a water-bath environment thus substantially to reduce produce loss after incurred as a result of handling inflicted damage.

PORTABLE SORTING MACHINE AND SORTING METHOD

BACKGROUND OF THE INVENTION

The invention relates generally to sorting and loading methods and mechanisms, and more particularly to a method and a portable sorting machine for use in the sorting and the loading of discrete articles of agricultural produce, such as tomatoes and similar fruit, preferably adjacent to points of harvest thereof.

The harvesting of fruits and vegetables is a notoriously old profession. Many devices and techniques have historically been employed in the harvesting of both domestic and wild crops. The oldest technique involves a selective manual harvesting or picking of the product. This technique, of course, has many disadvantages and has lead to much needed improvements in the agriculture-related profession, resulting in devices which serve significantly to reduce, and in some instances substantially to eliminate the manual labor required for harvesting given crops.

Frequently, devices employed for overcoming requirements for manual harvesting or handpicking effect an indiscriminate gathering of all existing produce and a consequential destruction of the plant. Techniques of this type are normally best suited to crops which can withstand rough and rugged handling without suffering bruises, ruptures and other delitorious effects. For example, certain nuts, corn, cotton, and various fruits and vegetables may be harvested utilizing machines which both harvest and subsequently sort and load the products according to predetermined criteria. However, where the crops being harvested are of a particularly fragile nature such as, for example, tomatoes, many principles and techniques heretofore employed in the mechanical harvesting, sorting and loading of agricultural produce simply have not always proven entirely satisfactory, particularly since harvesting-related machines for most annual crops are preferably of a type which can be transported and require limited permanent fixtures.

As can readily be appreciated, produce or agricultural products such as ripened tomatoes cannot withstand rough handling during the harvesting, and subsequent sorting and shipping of the produce. This is because the products normally are marketed or canned at some distant point, and handling induced or inflicted damage results in spoilage and loss before marketing or canning can occur. Consequently, numerous types of produce continue to require substantial amounts of manual labor in order that harvested produce may be shipped to market or to a cannery in a marketable condition.

SUMMARY OF THE INVENTION

This invention overcomes many of the aforementioned difficulties previously experienced in the harvesting and subsequent handling of fragile produce, such as ripened tomatoes, particularly in the sorting and loading phases of the harvesting operations, through the use of water-bath conveyors and loading machines particularly adapted for interfield transport.

Accordingly, it is an object of this invention to provide a practical method and apparatus for sorting and loading discrete articles.

Another object is to provide an improved method and apparatus for sorting and loading fragile discrete articles of agricultural produce.

Another object is to provide an economic and efficient apparatus for employment in harvest areas for sorting and loading fragile agricultural produce.

Another object is to provide a portable sorting and loading machine which employs a water-bath for use in sorting and loading discrete articles of agricultural produce in a water-bath environment preferably near the points of harvest thereof.

Another object is to provide a transportable article sorting and loading machine for use in culling discrete articles of agricultural produce and subsequently loading the selected produce in inundated containers effectively to minimize damage of the produce.

These, together with other objects and advantages, will become more readily apparent upon reference to the following description and the accompanying drawings.

DESCRIPTION OF THE PREFERRED EMBODIMENT

Figure 1:
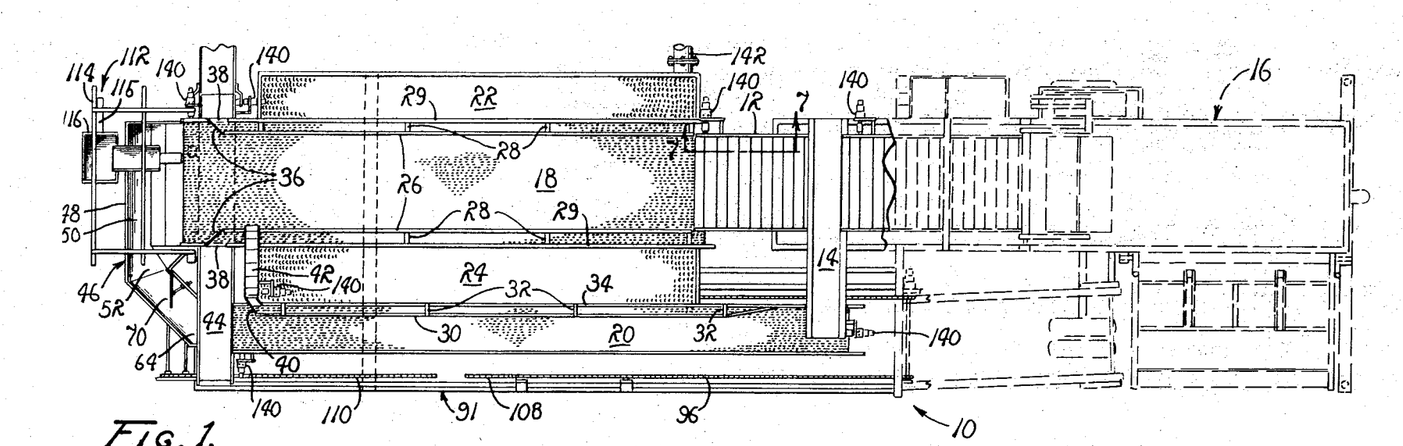
FIG. 1 is a top plan view of a sorting and loading machine embodying the principles of the present invention, with an adjacent article handling or pre-segregating apparatus illustrated in phantom lines.

Turning to FIG. 1, a sorting and loading machine embodying the principles of the present invention is shown at 10 having a frame 11.

The machine 10 normally includes a system for introducing segregated fruit such as tomatoes, for example, to be further culled or sorted as the fruit is advanced in the machine. As illustrated, a conveyor network including a conveyor 12 is employed for introducing ripened fruit or articles, while a conveyor 14 is employed to introduce segregated or presorted unripened discrete articles of agricultural produce. It is to be understood that while the disclosed embodiment requires conveyors 12 and 14 to introduce discrete articles of agricultural produce, it is deemed feasible to provide other types of article handling mechanisms for introducing the articles, depending upon a manner in which the articles are delivered to the machine 10.

As illustrated, the produce delivered to the machine 10, by the conveyor 12, has been preliminarily segregated by a sorter or sorting device 16, shown in phantom lines. The conveyor 12 thus also serves as a discharge mechanism for the sorter 16 so that the fruit delivered thereby constitutes ripened produce. The produce being introduced by the conveyor 14 is, on the other hand, discardable produce which is deemed to be under-ripened and for that reason has been separated from the ripened produce. However, as in practice frequently occurs, under-ripened produce will be included with the ripened produce as it is introduced by conveyor 12, even though the produce has been preliminarily segregated by the sorter 16. Therefore, an additional and more precise sorting operation is required.

In order that an additional sorting operation be accommodated, a first moving sorting table 18 is provided for receiving the produce as it is introduced by the conveyor 12. The table 18 is drivingly advanced in a manner such as to disperse as well as to convey the introduced articles past a sorting station. Further, a second moving sorting table or conveyor 20 is provided for receiving and dispersing the under-ripened articles of produce as they are introduced from the conveyor 14 in order that all of the produce thus introduced may be subjected to an additional culling or sorting operation.

In order to achieve a final sorting of the previously sorted or segregated produce, as it is conveyed by the tables 18 and 20, the tables are disposed in parallel and driven in a common direction. Adjacent to the driven tables are catwalks 22 and 24 which accommodate a required number of individuals, often referred to as "cullers", employed to observe the advancing fruit and to perform a final culling or sorting operation.

Normally, a crop is harvested only when the majority of the produce is ripened or otherwise deemed ready for market. Therefore, it is normally practical to assume that the sorting table which conveys the ripened produce through the machine must necessarily be provided with the largest conveying capacity. Hence, the conveyor 18 is, as shown, considerably wider than conveyor 20 which conveys the under-ripened produce.

For a like reason, the table or conveyor 18 is accessible from catwalks 22 and 24, while the sorting table or conveyor 20 is accessible from only catwalk 24. As the individuals employed to perform the additional sorting of the produce must visually observe and select articles deemed out of place, or present on the wrong conveyor or table, it is desirable that means be provided to assist the culler in removing and reconsigning the articles to the appropriate conveyor or sorting table.

In order to facilitate a practical and an efficient sorting operation, wherein the articles are interchanged between the tables, a first pair of guide rails 26 are supported in a cantilevered fashion above a longitudinal segment of the conveyor or sorting table 18 at both of the outermost edges of the table. Suitable support members or hangars 28 serve to mount the rails while the hangars are, in turn, supported by an adjacent guide rail 29 supported on the frame 11 of the machine in any suitable manner. Similarly, a guide rail 30 is supported by a hangar 32 and a fixed guide rail 34 so that the guide rail is extended over a longitudinal segment of the sorting table or conveyor 20.

Therefore, it will be readily appreciated that the pairs of guide rails 26 and 29, as well as the guide rails 30 and 34, in effect, divide the sorting tables thus to form auxillary or additional conveying surfaces for conveying articles or produce along a path adjacent the conveyors 18 and 20.

In order that articles conveyed between the rails 26 and 29 be precluded from returning to the sorting table 18, a diagonally disposed bumper-plate 36 is extended across the auxillary conveying surfaces near the terminal portions of the guide members. These plates serve outwardly to deflect the articles conveyed between the guide rails. At both outermost edges of the additional conveying surfaces, opposite to the bumper-plates 36, openings 38 are formed by the abrupt termination of rails 29. Hence, as articles are conveyed between the guide rails 26 and 29 to engage the bumper-plates 36, they are deflected outwardly and from between the rails and off the conveying surface. To achieve a similar result for the articles conveyed between the guide rails 30 and 34, a curved bumper-plate including a discharge chute 40 is provided to discharge the articles near the terminal portion of the guide rails.

Beneath the chute 40 there is provided a crossover conveyor 42 so arranged as to receive the articles discharged by the chute 40. The conveyor 42 serves to transport the articles away from the chute 40 to deposit them off the sorting table 18. Hence, individuals employed for performing additional culling or sorting operations arrange themselves upon the catwalks 22 and 24 and visually observe the articles of produce as they are conveyed by the moving sorting tables 18 and 20. As the articles are conveyed by the sorting tables, red or ripened articles appearing on the sorting table 20 are removed and deposited between the guide rails 30 and 34, whereupon these articles ultimately are conveyed by the crossover conveyor 42 to the sorting table 18. In a similar manner, green or under-ripened articles are culled from the ripened articles of the sorting table 18 and deposited between the guide rails 26 and 29. The articles are then conveyed to the bumper-plates 36 where they are discharged through the openings 38. Since green fruit may, for the purpose of describing the invention, be deemed to be unusable, any suitable means may be used to remove this fruit from the machine. In practice, a receiver including a conveyor 44 has been provided for this purpose.

The articles conveyed by the sorting table 18 are considered to be the useable or ripened products. Therefore, it is preferable that articles received from the conveyor 18 be received in a manner which protects the articles from bruising.

Figure 3:
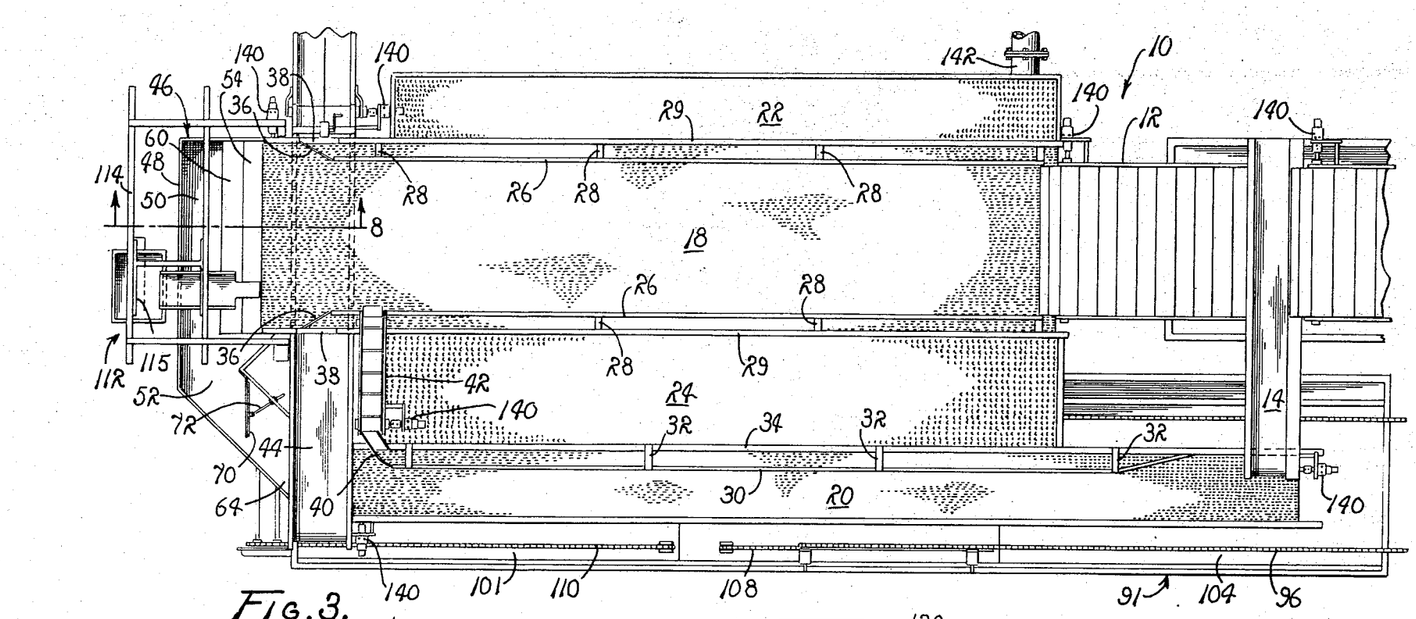
FIG. 3 is a top plan view on an enlarged scale, of the device shown in FIG. 1.

In order that the articles be received from the conveyor 18 in an undamaged condition, a water-filled receiver 46 is provided. The receiver 46 extends below the terminal end portion of the conveyor 18 and includes structure forming a compartment or tublike component including vertical walls 48 and bottom wall 50. The receiver also includes at one side thereof an opening 52, as shown in FIG. 3. This opening is of a relatively large cross section and serves as a discharge port for the receiver. As a practical matter, the receiver 46 may be deemed a weir discharging a flow of water and articles through the opening 52. The water employed serves as a water-bath for absorbing impact forces to avoid infliction of handling damage. An extended member or draper 54 is mounted in the receiver and serves as a further shock absorbing mechanism to accommodate a relatively gentle transfer of the ripened products from the sorting table.

As the opening 52 discharges from the receiver 46, it is readily apparent that the discharge includes the contents of the receiver, including both the water and the articles being handled, so that the articles are thus caused to be transferred from the receiver in the water-bath environment whereby damage normally encountered in further handling can be readily avoided.

In order that the weir may be supplied with an operatively sufficient quantity of water, an inlet port 56 is disposed near the center of the bottom wall 50 of the receiver 46. This port communicates with a suitably pressurized source of water normally crop irrigation water, through a conduit 58. The water is discharged from the port against a baffle plate 60. The plate 60 serves to accommodate a rapid discharge or flow of water into the receiver 46, while avoiding undue agitation of the water and articles maintained in the water-bath. Articles discharged from the receiver 46 are transported in their water-bath from the receiver to a container loader 62. This transporting of the articles is facilitated through a provision of a suitable flume 64 which connects the receiver with the loader and, in effect, serves as a fluid conduit for the articles as they are transported in a water-bath environment.

Figure 4:
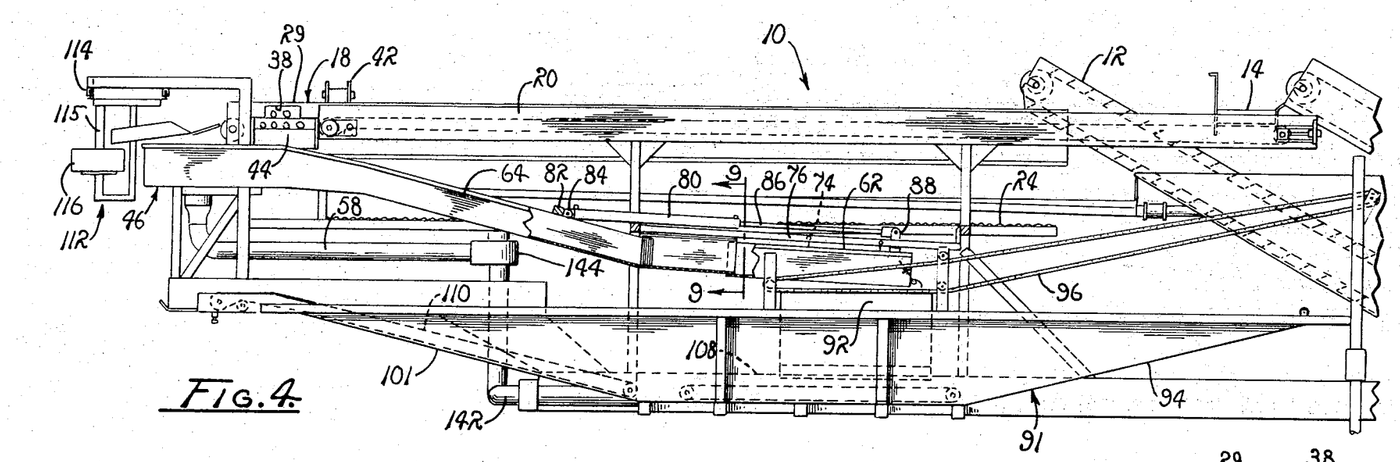
FIG. 4 is a partial side elevation of the structure shown in FIG. 2.
Figures 5, 7, 10:
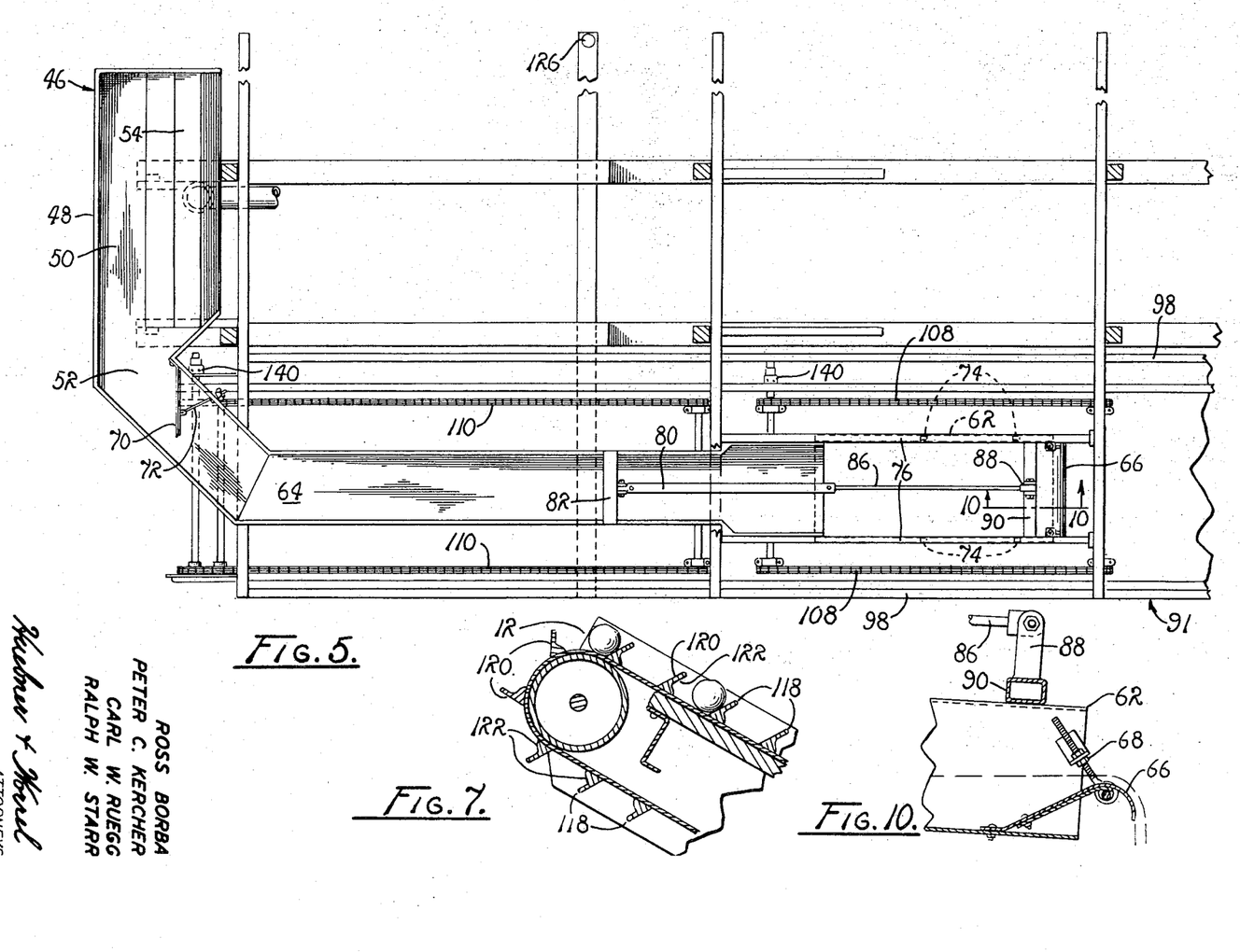
FIG. 5 comprises a partial plan view taken on line 5-5 of FIG. 4.
FIG. 7 is a partially sectional, fragmented view taken on line 7-7 of FIG. 1, and on an enlarged scale, illustrating a flight-bar arrangement for a conveyor employed by the embodiment of FIG. 1.
FIG. 10 is a partially sectioned elevation of the loader of FIG. 9 and taken on line 10-10 of FIG. 5.
Figure 6:
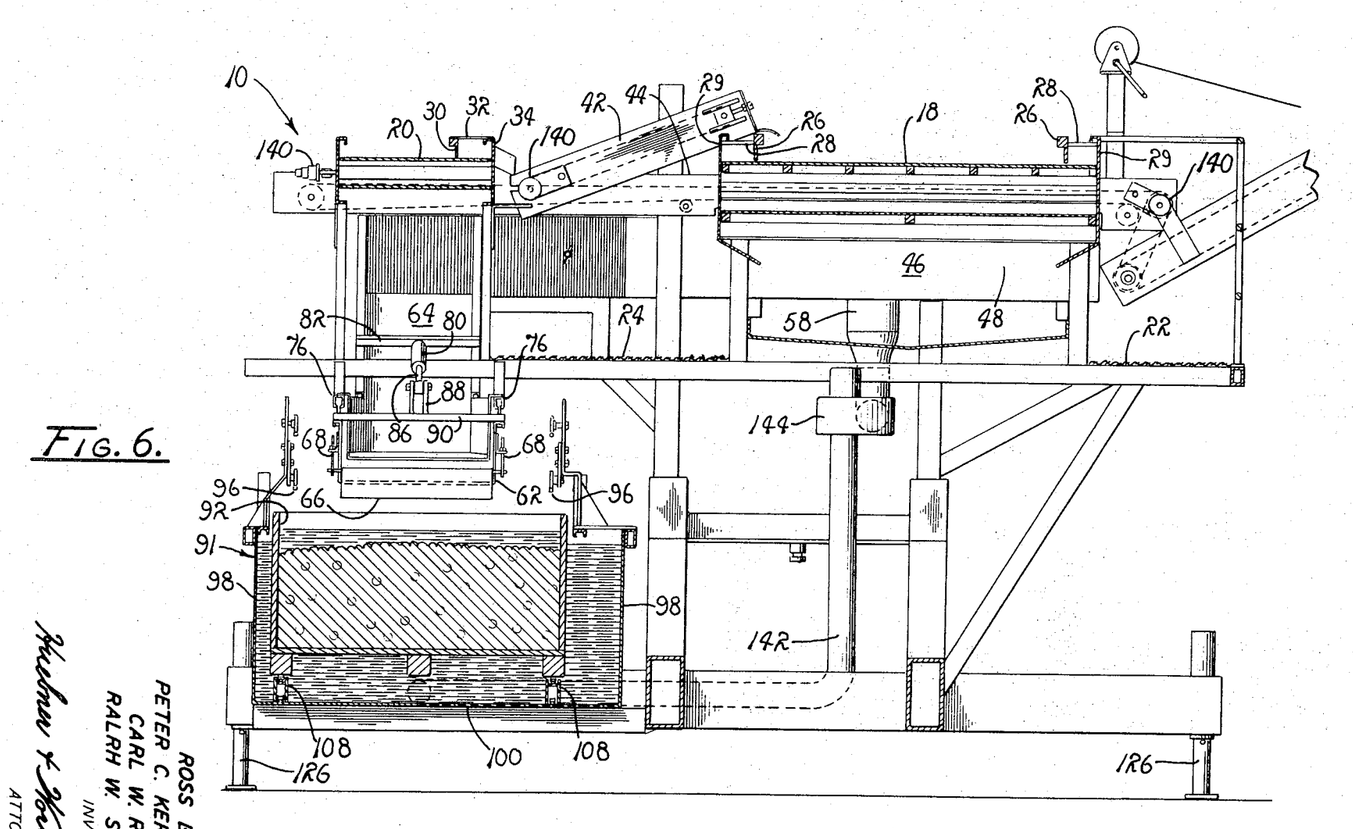
FIG. 6 is an end elevation taken on line 6-6 of FIG. 2.
Figure 8:
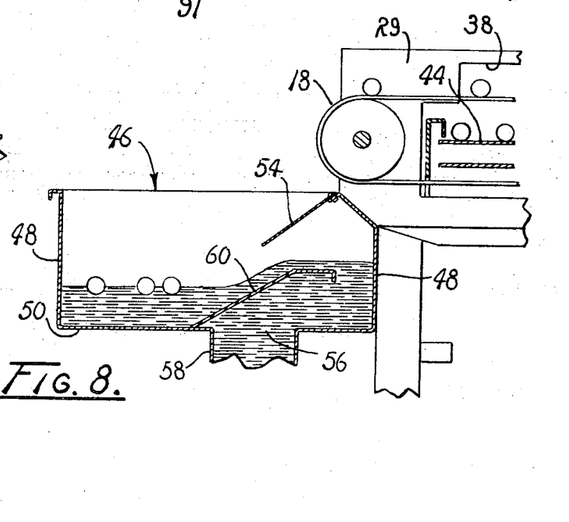
FIG. 8 is a partially sectioned, fragmented view taken on line 8-8 of FIG. 3, illustrating a flooded weir employed by the embodiment shown in FIG. 1.
Figure 9:
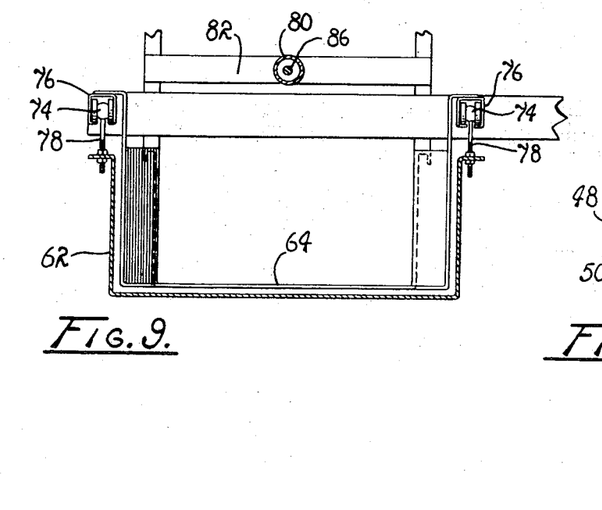
FIG. 9 is an enlarged partially sectioned view of the container loader employed by the disclosed embodiment and taken on line 9-9 of FIG. 4.

As more clearly shown in FIGS. 4, 9 and 10, the loader 62 is formed as an open ended chutelike component for discharging the articles of produce in a water-bath environment. A flexible bumper or draper 66 is provided at the terminal end of the loader 62 and serves as a rate of flow control device which effectively dictates the rate at which the articles are discharged from the loader 66. Adjustment of the draper 66 is achieved through a conventional turnbuckle arrangement 68 which serves selectively to raise and lower the draper, as desired.

Furthermore, in order to control the rate of flow through the conduit or flume 64, it has been found desirable to include in the flume an adjustable transversely disposed pivoted gate 70. This gate includes a screw-threaded coupling 72 whereby adjustment of the gate about a pivot 73, FIG. 5, may be achieved so that a cofferdam is established upstream from the loader 66. Therefore, between the effect of the gate 70 and the draper 66, the rate of flow of produce from the loader 62 may be effectively controlled.

The purpose of the loader 62 is to effect an introduction of the produce into shipping containers. Consequently, to effect control of the loading operation performed by the loader 66, it is preferred that the loader be supported for reciprocal displacement. To achieve this, the loader is suspended from a plurality of bearings 74 mounted in support tracks or rails 76. These bearings and tracks are coupled to the loader 66 by suitable suspension hangars 78 which serve to permit a telescoping of the loader 62 along the terminal extremity of the flume 64. The loader 62 is operatively reciprocated, as required, in order properly to introduce articles of agricultural produce into shipping containers disposed beneath the loader 66.

As can be appreciated, reciprocation of the loader 62 normally requires appreciable force, applied axially thereto. Manual actuation is not deemed practical. Hence, a double-acting hydraulic ram 80 is pivotally connected at its fixed end to a suitable fixed footing or support member 82 by means including a pivot pin 84. The ram 80 normally includes a double-acting displaceable piston, the shaft 86 of which is shown in FIG. 5. At the outermost extremity of the shaft 86 there is mounted a clevis 88 fixed to a transversely disposed support member 90. The support 90 is suitably coupled to the loader 62 in a supporting relationship therewith. An appropriate operation of the ram 80 serves to drive the loader 62 in selected directions, as it is supported by the bearings 74, along the terminal portion of the flume 64.

Since the loader 62 discharges the articles in a water-bath, provisions are made to receive containers beneath the loader in a manner such that the water-bath is maintained during the introduction of the articles into the containers. Therefore, a tub or substantially watertight compartment 91 is supported beneath the loader. The tub 91 is best illustrated in FIG. 4 and is so constructed as to accommodate an advancement of shipping containers 92 therein.

In order to achieve an advancement of suitable shipping containers 92 within the tub 91, a first wall 94, forming an inclined ramp is provided for the tub. Disposed above the wall 94 there is provided a holddown conveyor 96. The purpose of the holddown conveyor 96 can readily be appreciated when it is understood that the containers 92 are maintained in an inundated condition within the tub 91 beneath the loader 62 as the articles are discharged while still in a water-bath environment. Hence, the holddown conveyors prevent the boxes or containers 92 from floating askew as they are advanced beneath the loader 62.

In order that the containers 92 be inundated, the tub 91 beneath the loader 62 also includes vertical walls 98 and a horizontally aligned bottom wall 100 which terminates at the inclined wall 94 and at an oppositely disposed, inclined ramplike wall 101. The walls 94, 98, 100 and 101 serve to establish the watertight tub 91. The uppermost surface of the wall 94 functions as an approach ramp while the uppermost surface of the wall 101 serves as a discharge ramp at the discharge side of the loading station. Consequently, as the produce, such as tomatoes, are discharged from the table 18 into the water-bath at the receiver 46, and subsequently discharged through the flume 64 and through the loader 62 into awaiting and inundated containers 92, little or no appreciable damage is inflicted on the produce because of the shock absorbing effect of the water-bath. In order first to support and then to remove the filled containers 92 from beneath the loader 62, a driven conveyor belt 108 is provided which extends along the uppermost surface of wall 100 for supporting the containers 92 in article receiving and, subsequently, their loaded conditions.

Once a container 92 has been loaded in a manner sufficient to satisfy an operator for the machine, the belt 108 is driven to advance the filled container 92 from beneath the loader 62. As the container is advanced from beneath the loader, it is engaged by an inclined discharge conveyor 110. The conveyor 110 is supported by the wall 101 and frictionally engages the bottom of containers 92 after they have been advanced and discharged by the conveyor 108. The discharge conveyor 110 advances the containers above the water level of the tub 91, permitting the water contained therein to be "leaked" and drained back into the tub 91. As the containers 92 are advanced from beneath the loader 62, empty containers are introduced along the wall beneath holddown conveyors 96. Since the loader 62 is mounted on a reciprocating drive mechanism, it is preferable to begin a loading of the containers 92 as they approach a position beneath the loader 62 and to continue the loading until such time as they have been completely advanced into a fully positioned attitude beneath the loader 62. Consequently, it is possible continuously to transport the containers in an uninterrupted manner past the loader 62.

It is a common practice in the harvesting of agricultural produce to provide random samplings of the produce being harvested for grading or other purposes. Therefore, the described embodiment of the instant invention is provided with a suitable scoop sampler 112. The sampler is mounted for transverse reciprocation relative to the terminal end of the conveyor belt or sorting table 18. While various devices could be employed to support the sampler, a suitable rod and hangar assembly 114, FIG. 4, has been found suitable. In order for an inspector to acquire a sample of the fruit being processed, he need only reciprocate the sampler 112 along its support rod into the path of the articles being discharged from sorting table 18. As presently employed, the sampler is formed as an openend conduit. Therefore, the assembly 114 also includes a container support 115 for supporting a container 116 in an article receiving disposition relative to the discharge end of the sampler 112.

Turning to FIG. 7, the conveyor 14 also includes a plurality of horizontally disposed, parallel flight bars 118. These bars serve to raise the articles being introduced above the level of the sorting table 18 and then to lower the articles to the level of the table. This is effectively achieved by the particular inclination and the configuration imparted to the flight bars. As is illustrated in FIG. 7, the bars are reversely inclined so that the leading surface 120 of each flight bar serves to engage articles being transported, as the articles are being raised above the surface of the table 18, and permits the rearmost surface 122 of an adjacent flight bar to support the raised articles as they are lowered to the surface of the table 18.

For purposes of simplifying the description of the invention, it is sufficient to understand that the frame 11 is of any suitable beam construction mounted on wheels 124 for rendering the mechanism totally portable whereby it readily may be transported between harvesting fields. Furthermore, extension type, jacklike support members 126 are provided to serve as leveling and supporting devices for supporting the machine in its employment attitude. It is readily apparent that while various devices could be employed for supporting the machine that disclosed is excellently suited to provide dependable operational support and desired mobility.

Figure 2:
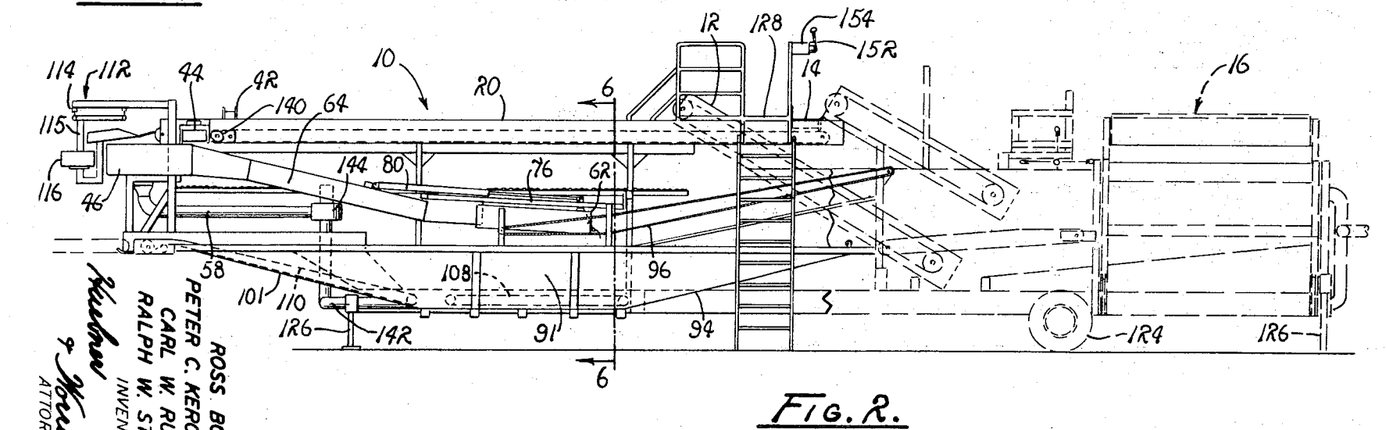
FIG. 2 is a side elevation of the machine shown in FIG. 1, further illustrating an operator's platform as normally employed by the disclosed embodiment of the present invention.
Figure 11:
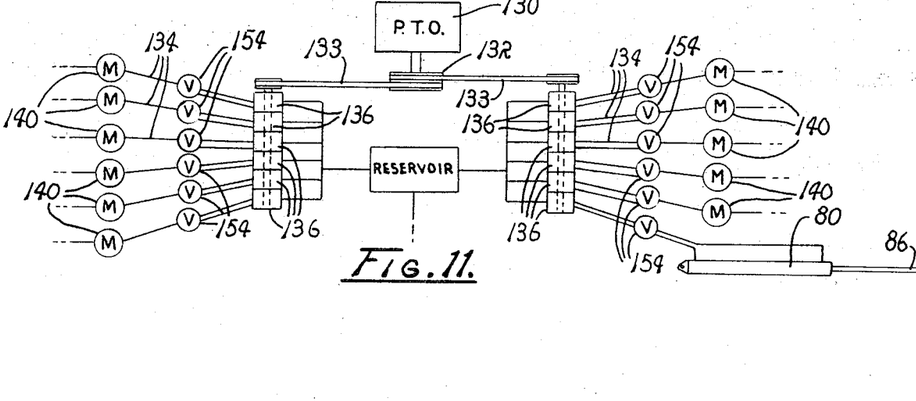
FIG. 11 is a schematic diagram illustrating the hydraulic system employed in the disclosed embodiment.

Once the machine 10 is operatively situated, control thereof is simplified by a suitable control system. As shown in FIG. 2, an operator's platform 128 is located in a position which affords an operator a vantage point for observing the overall operation of the machine 10 and its associated components. While various types of power units and related control means could be employed in the operation of the machine, an hydraulic system which tends to reduce power requirements and complexity of control is preferred. As illustrated in FIG. 11, the employed drive mechanism for the machine 10 includes a PTO (power take off) unit 130 of the type normally provided by agricultural tractors. A plurality of sheaves 132 and associated V-belts serve to connect the PTO with the machine. A series of hydraulic conduits 134 are provided and connected to hydraulic pumps 136 for supplying the necessary fluid to the machine. Mounted in each drive train, as provided for the various conveyors, water pumps and the like, there is an hydraulic motor 140. Since each motor 140 is of conventional design and functions in a well-known manner to impart to drive to the associated portion of the machine, it is not deemed necessary to describe the motors 140 in detail. It is believed sufficient to understand that each hydraulic motor 140 is of a type which is powered by one of pumps 136 connected thereto by the conduits 134 and driven by the PTO unit 130. Although not fully illustrated, the operations of the machine are dictated by the machine operator located on the machine from a control center on the operation platform 128.

The operator's platform 128 includes a control panel 150 accessible to the operator. The panel 150 includes a plurality of manually actuatable levers 152, FIG. 2, which serve as control means for the various hydraulic motors 140. The levers 152 are connected by suitable conventional mechanical linkages, not shown, to a multiplicity of hydraulic selector valves 154 through which the hydraulic fluid is supplied by pumps 136 to the motors 140.

As is readily apparent from the drawings, each driven component is powered independently of other components by a motor 140. For example, the conveyor 12 may be halted while the conveyor 18 is permitted to continue to advance articles past the sorting stations, in order to permit the sorters or cullers to catchup in the sorting operation. Similarly, the conveyor 14 may be halted while the conveyors 12, 18 and 20 continue to advance the articles. Such versatility is afforded the machine 10 through the specific arrangement which mounts a motor 140 at each conveyor and water pump as provided for the machine.

To achieve the desired control through manipulation of a selector valve 154, it is to be understood that the valve is of conventional type, each including an inlet and an outlet port on the pressure side, and an inlet and an outlet port on the return side of the valve. Thus arrangement accommodates an hydraulic switching or "short circuiting" of the motor 140 by merely connecting the outlet port of the pressure side of the valve with the inlet port of the return side thereof. With this conventional arrangement being provided for each of the motors 140, it is readily apparent that in order for the operator to stop the drive for any given machine component, it is only necessary that he manipulate one of the levers 152 for one of the valves 154 so that the motor 140 connected to that component can effectively be short circuited, hydraulically.

In order to activate a given machine component, the operator merely manipulates a given lever 152, at the platform 128, which is mechanically linked to the valve 154 hydraulically connected to the particular motor 140 connected with the component to be actuated. The pressure side of the valve 154 is thus caused to be connected to the pressure side of the motor 140 and the motor and consequently the machine component is activated.

It has been found preferable to provide an assistant for the machine operator in the filling of the containers 92 utilizing the loader 62. In such cases, the assistant operator will be located in an area where his full attention can be directed to the loading of the containers 92 as they are presented to the loader 62 within the tub 91. The assistant is provided with suitable means for controlling the piston or hydraulic ram 80 for reciprocating the loader 62 above the containers 92. Such a system also includes a lever 152 and valve 154 of the type hereinbefore described. In practice, it is deemed advisable to connect both sides of the ram 80 to a selector valve 154.

In order to simplify the description of the invention, it is believed sufficient to understand that the PTO unit 130 comprises the prime mover for the machine and conveniently has a minimum speed of 540 r.p.m. (revolutions per minute) and is rated at 85 horse power. Of course, all underwater bearings are of noncorrosive materials such as, for example, micarta blocks. The frame is so constructed that the machine is, in effect, mounted on a trailer which may be towed by a tractor or truck to its point of use.

The water utilized is, in practice, normally supplied from an irrigation ditch or a standpipe at a conventional connector 142 and is circulated by a suitable hydraulic driven pump 144 mounted on the frame 11 and connected at a convenient location. In practice, the pump has a capacity of 700 to 900 gallons per minute. In some circumstances, as may be required by certain sanitation conditions, it may not be found desirable to recirculate the water through the machine 10. Therefore, where desired, the pump 144 will introduce water from the irrigation system with a continuous discharge thereof being directed from the tub 91 back into the irrigation system. One embodiment of the instant invention has a proven hourly capacity of 70 tons of tomatoes per hour and yet requires only the minimum power requirements heretofore mentioned.

OPERATION

It is believed that operation of the described embodiment of the instant invention is clearly evident and it is briefly summarized at this point.

As aforementioned, the machine 10 is supported for transport by wheels 124 which accommodate a transporting of the machine into the harvest areas or fields. The machine is employed within the area until such time as harvesting has been completed, whereupon the machine is removed to the next harvest area or field for use in harvesting operations there being conducted. While the described embodiment has a capacity of approximately 70 tons per hour it is readily towable by a farm tractor or truck of readily available types. However, a source of water is necessary since the machine normally requires a recirculating supply of approximately 700 to 900 gallons per minute. Usually such supply is readily available in larger agricultural areas in the form of irrigation water carried by conventional irrigation ditches or pipelines.

Once the machine has been operatively set up or supported by the jacks in a given field and harvesting has begun by hand or machine picking operations, filled containers including boxes, crates or skiffs and the like are transported to the machine. If desired, the produce may be presorted or preliminarily segregated either by hand or by a suitable presorting machine such as that designated 16.

In the case of tomatoes, the ripened or red fruit is introduced into the machine 10 by the conveyors 12 and deposited on the moving sorting table 18, while the green or under-ripened fruit is caused to be deposited on conveyor 14. The conveyor 14, in turn, deposits the fruit on a moving sorting table 20. As the produce is deposited on sorting tables 18 and 20, it tends to be dispersed as discrete articles. The movement of the tables convey the dispersed fruit past cullers or employed individuals located along the catwalks 22 and 24. These cullers perform a final culling or sorting operation to assure that the finally sorted fruit meet certain criteria as to maturity.

In sorting operations the individuals remove from the table 18 green or under-ripened fruit, and from the sorting table 20 ripened or red fruit. Normally, several individuals will be involved in order that both tables may be tended simultaneously. As the green or under-ripened fruit is removed from the table 18 it is deposited between the rails 26 and 29 in order that it may be removed from the table 18 and ultimately the machine 10. As for the ripened fruit present on the conveyor 20, it is manually removed and deposited between the guide rails 30 and 34 in order that it may be transported to the crossover conveyor 42 located at adjacent terminal ends of the tables 18 and 20. The crossover conveyor 42 receives the fruit from between the guide rails 30 and 34 and discharges it onto the table 18 for further handling. The aforementioned under-ripened or green fruit, which has been removed from the table 18, is ultimately deposited on a receiver conveyor 44 as the conveyor passes beneath conveyor discharge points 38 and is dispersed to other points for further operation, with which the present invention is not concerned.

The ripened fruit passing from the conveyor 18 is received in a water-bath at the receiver 46. The receiver 46, in essence, constitutes a flooded weir 48 and includes a cooperating draper 54 which aids in the transfer of the fruit from the conveyor 18 to the weir in a manner such as to avoid damaging the fruit. The flooded weir of the receiver provides the waterbath into which the tomatoes are deposited and from which the articles are subsequently discharged into the flooded flume 64. The flume serves as a fluid conveyor for conveying the fruit to a loader 62. As the fruit leaves the receiver 46 and is conveyed by the flume to the loader, containers 92 are advanced into a receiving position and are maintained in a receiving attitude beneath the loader. The holddown conveyors 96 support the containers in their proper attitude as they are advanced beneath the loader 62.

In practice, an assistant operator manipulates the loader in a reciprocating fashion through a manual actuation of a pair of valves 154 to control operation of the hydraulically actuated ram 80, whereby introduction of the fruit into the containers is initiated as the containers are advancing into a position beneath the loader. The container itself is supported in an inundated condition within the tub 91. Therefore, it will be appreciated that from the time the fruit is discharged from the sorting table 18 until such time as it is introduced into the containers 98 and conveyed from the loader, it has been maintained in a protective water-bath environment and damage thereto has been minimal. The conveyors 108 and 110 serve to remove the filled containers 92 from the tub 91 and advance the filled containers up the wall 104 to permit the water to drain from the containers back into the tub.

In practice, it may be preferred that the water be recirculated between the tub and the receiver 46. This can be achieved by an hydraulically operated pump 144 driven and controlled by an hydraulic motor 140 which is, in turn, controlled by valves 154. A manipulation control may be effected through a float and valve control arrangement, if desired. As such, the pump 144 is caused to withdraw water from the tub 91 while water is forced through the conduit 58 and the port 56 of the receiver.

As is common in harvesting operations, it may be found desirable to select portions of the fruit from the sorting table 18 in order that it be inspected and tested for various characteristics. This inspection is herein accommodated by the use of the scooplike sampler 112 which includes a lip disposed adjacent the discharge end of the table 18.

In order that the fruit may be removed, it is only necessary that the lip of the sampler 112 be disposed in a flow intersecting relationship with the fruit as it advances from the sorting table 18 in order that the sampler may act as a scoop and remove the fruit and deposit it in a suitable supported container 116 mounted on the support 114.

Operation of the conveyor 14 requires an introduction of the fruit to the table 18 in a manner which will permit the fruit to be transported without receiving bruises, ruptures and the like. Hence, the inclined flight bars 118, having forward or leading surfaces 120 for advancing the fruit to a position above the conveyor 18 and rearmost surfaces which supports the fruit in a vertical drop to the table, serve to advance the fruit as it is transported from the conveyor 12 to the table 18 in an undamaged condition.

All of the aforedescribed operations are under the direct control of an operator located on the operator's platform. The operator controls the machine through a series of hydraulic controls leading ultimately to the driving train including the pumps 136 and the motors 140.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

We claim:

1. A portable machine for use in sorting fragile discrete articles and subsequently loading selected articles in selected containers, comprising:
   a mobile support including a frame supporting the machine adapted to be mobilized for transporting the machine between selected areas of use;
   article delivery means including article handling means supported by the frame adapted to deliver previously segregated articles for further sorting:
   means defining a plurality of sorting stations:
   A plurality of sorting tables including driven conveyors mounted in parallel alignment adjacent to the delivery means adapted to receive and transport delivered articles from the delivery means past a plurality of sorting stations at which sorting of the previously segregated articles is effected;
   an article receiver mounted on said frame adjacent to the discharge portions of the sorting tables for receiving said articles as they are caused to be discharged from the tables;
   a plurality of article distributing conveyors conveying said articles from the receiver means;
   means defining a container loading station including container positioning means adapted to receive and support open containers in an article receiving attitude;
   a reciprocating loader adapted to deposit sorted articles in containers at said loading station;
   container advancing conveyor means adapted to transport containers to the container positioning means; and
   means operatively coupled with the container positioning means for conveying loaded containers from the loading station.

2. The combination according to claim 1 wherein the mobile support further includes:
   a plurality of supporting transport devices adapted to support the frame during transport of the machine; and
   extensible jacks coupled to said frame adapted fixedly to support the machine in an operative attitude at a selected area of use.

3. The combination of claim 2 wherein the article receiver includes a water-filled compartment defining a weir having an open top disposed in an article receiving disposition and spaced beneath one end of at least one of the sorting tables for receiving fragile articles in a water-bath as they are discharged and released to fall from the sorting table, and wherein at least one of the article distributing conveyors comprises an inclined flume operatively coupled with said weir for transporting received articles in the water-bath from the receiver to the container loading station.

4. The combination according to claim 3 further comprising a water-filled tub mounted on said frame adapted to support the container loading station therein, whereby the containers are caused to be inundated as they are transported to the loading station and prior to receiving articles from the loader so that the articles are caused to discharge into a water-bath for thus maintaining continuity in the water-bath.

5. The combination of claim 4 in which the article handling means comprises:
   a plurality of inclined conveyor belts; and
   article-supporting flight bars mounted in transverse alignment on said belts and reversely inclined to support discrete articles at either side thereof as the belts are caused first to raise and subsequently to lower the fragile articles to the surface of the sorting tables.

6. The combination according to claim 5 wherein conduit means are coupled to the receiver adapted continuously to supply water thereto; and
   means for reducing induced turbulence within the receiver.

7. The combination of claim 7 further comprising:
   a flow control means including an adjustable gate mounted in said flume for controlling the rate of flow therethrough; and
   a vertically adjustable draper mounted at the discharge end of the reciprocating loader for controlling the rate of discharge of discrete articles from the loader, whereby the rate at which articles are delivered from a sorting table to containers supported at the loading station is effectively achieved.

8. The combination of claim 7, wherein the means defining a sorting station includes:

a catwalk mounted on said frame for supporting operatively employed cullers adjacent to said sorting tables; and a conveyor network interconnecting the tables, whereby the articles may be selectively culled by the cullers and subsequently conveyed to a preselected article receiver.

9. The combination of claim 8, wherein at least one of the article distributing conveyors includes a discard conveyor disposed adjacent to one of the tables adapted to receive articles discharged from the table, whereby useable articles may be loaded by the loader and culled articles may be discarded.

10. The combination of claim 1, further comprising:

a container advancing conveyor for advancing containers to the loading station including driven holddown means mounted above the containers for retaining the containers in a preselected attitude as the containers are advanced to be loaded by the reciprocating loader.

11. A portable sorting and loading machine adapted for use in the culling and loading of discrete articles of harvested agricultural produce comprising:

support means adapted to support the machine including transport means adapted to accommodate transport of the machine to the fields of harvestable produce;

delivery means for delivering discrete articles of produce to the machine, including a first delivery means for delivering ripe produce and a second delivery means for delivering under-ripened produce;

a pair of sorting tables including a first conveyor belt disposed adjacent to the first delivery means for receiving ripe produce, and a second driven conveyor belt disposed in parallel alignment adjacent to the second delivery means adapted to receive under-ripened produce;

a pair of sorting stations including a first auxiliary conveyor system arranged adjacent to the first driven conveyor belt, and a second auxillary conveyor system arranged adjacent to the second driven conveyor belt and at least one catwalk arranged adjacent the sorting tables;

a first and a second interconnecting conveyor means interconnecting the output of the first and the second auxillary conveyor with the output of the first and second driven conveyor belts, whereby ripe produce is caused to be delivered from the second auxillary conveyor system with the produce delivered from the first driven conveyor belt, and under-ripened produce is caused to be delivered from the first auxillary conveyor system with the under-ripened produce delivered by the second driven conveyor belt;

a first and a second receiver connected with the output of the first and second driven conveyor belts, whereby the ripe produce is caused to be received from the first conveyor belt by the first receiver and under-ripened produce is caused to be received from the second conveyor by the second receiver;

a produce sampler arranged adjacent the first receiver for extracting produce as it is discharged by the first receiver;

a first and a second produce distribution conveyor connected with the first and the second receivers, whereby articles of produce received by the first receiver are caused to be transported by the first distribution conveyor and articles received by the second receiver are caused to be transported by the second distribution conveyor;

a container advancing conveyor operatively associated with the output of the first distribution conveyor for advancing and delivering containers to the output end of the first produce distribution conveyor in a produce receiving attitude;

a reciprocating loader affixed to the output end of the first produce distribution conveyor adapted to introduce produce into the containers as the containers are advanced;

means connected with the loader adapted to adjust the rate at which produce is introduced into the container; and means for conveying filled containers from the output end of the first distribution conveyor.

12. The combination of claim 11, wherein the first receiver comprises a flooded weir disposed adjacent the first driven conveyor belt to receive articles in a protective water-bath, the first distribution conveyor comprises a flooded flume connected to the weir, whereby the articles of produce are caused to be transported to the reciprocating loader in a water-bath.

13. The machine of claim 11 further comprising container inundating means for inundating containers as they are supported in an article receiving attitude, so that the ripe produce is caused to be transported from the first driven conveyor belt, and introduced into the containers in a protective water-bath.